United States Patent
Bronfer et al.

(10) Patent No.: US 7,167,532 B1
(45) Date of Patent: Jan. 23, 2007

(54) METHOD AND APPARATUS FOR GENERATING AN OVERSAMPLING CLOCK SIGNAL

(75) Inventors: Alexander Bronfer, Ramat Gan (IL); Ronen Isaac, Tel Aviv (IL); Udi Suissa, Givataim (IL)

(73) Assignee: Texas Instruments Incorporated, Dallas, TX (US)

( * ) Notice: Subject to any disclaimer, the term of this patent is extended or adjusted under 35 U.S.C. 154(b) by 877 days.

(21) Appl. No.: 10/133,609

(22) Filed: Apr. 26, 2002

(51) Int. Cl.
*H04L 7/00* (2006.01)
(52) U.S. Cl. .................................. 375/355
(58) Field of Classification Search ............. 375/355
See application file for complete search history.

(56) References Cited

U.S. PATENT DOCUMENTS 5,454,007 A * 9/1995 Dutta ..................... 375/322
6,249,555 B1 * 6/2001 Rainbolt .................. 375/354
6,985,819 B1 * 1/2006 Lipscomb et al. .......... 702/57
2004/0077319 A1 * 4/2004 Koike et al. .............. 455/101

\* cited by examiner

*Primary Examiner*—Kevin Kim
(74) *Attorney, Agent, or Firm*—Ronald O. Neerings; W. James Brady, III; Frederick J. Telecky, Jr.

(57) ABSTRACT

A timing estimation mechanism operative to generate an oversampling clock signal for a large range of reference clock frequencies without requiring use of a PLL. The oversampling timing mechanism generates appropriate timing instances, typically for the purpose of sampling a received data signal in a digital communications system, without requiring a specific external clock source but rather by utilizing a clock source having any arbitrary frequency. The mechanism of the present invention is especially suited for use in applications where a specific external clock source (e.g., integer multiple of the data rate) is not available and wherein the implications of the use of a PLL cannot be tolerated. The oversampling clock estimation mechanism generates a clock signal which may be unevenly distributed over the symbol period, but whereby on average, the correct number of samples is produced over a specific time duration.

22 Claims, 5 Drawing Sheets

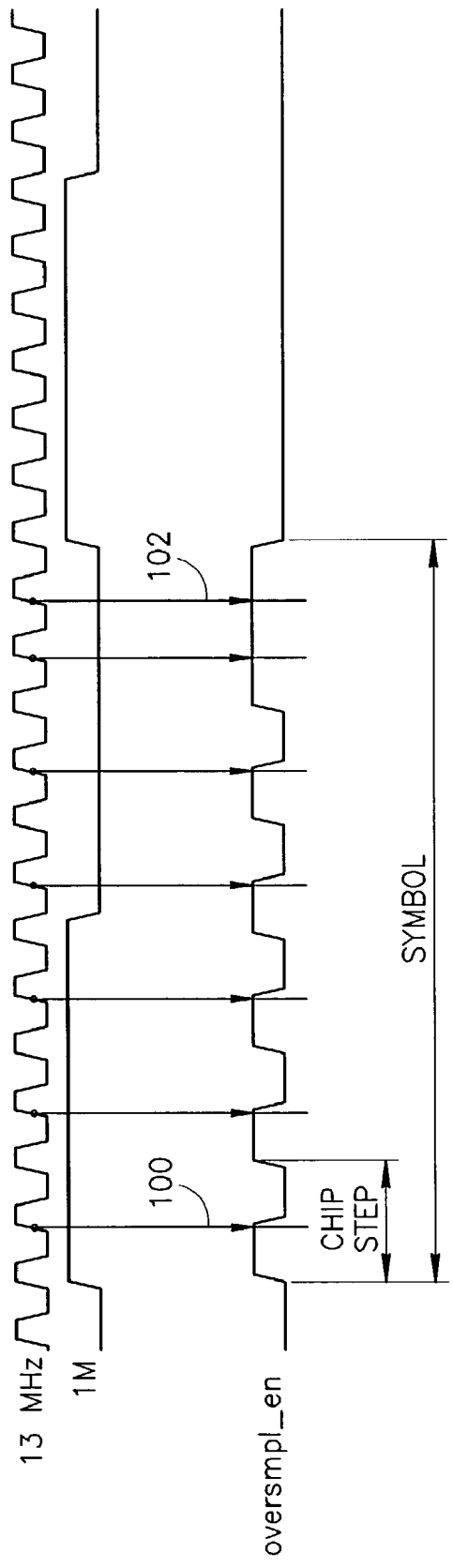
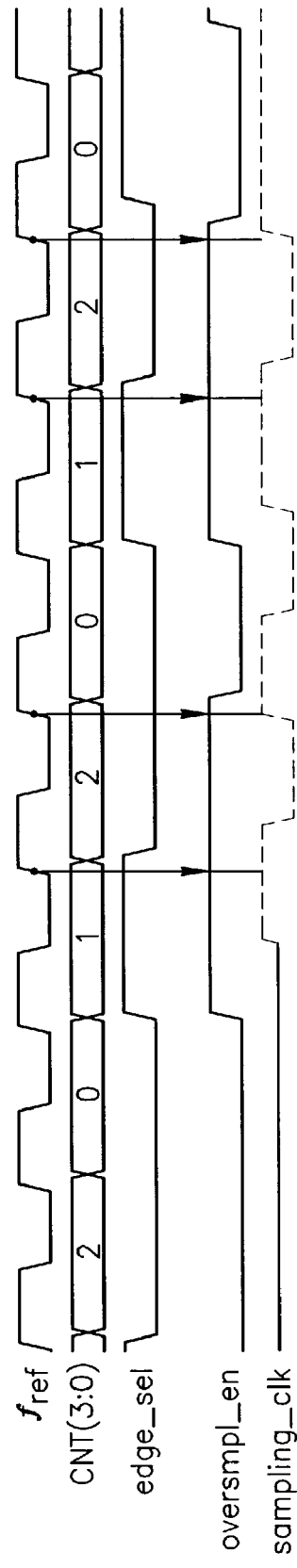
FIG. 4
FIG. 5

METHOD AND APPARATUS FOR GENERATING AN OVERSAMPLING CLOCK SIGNAL

FIELD OF THE INVENTION

The present invention relates generally to data communication systems and more particularly relates to a method of and apparatus for generating an oversampling clock signal.

BACKGROUND OF THE INVENTION

In communication systems it is often a requirement of the receiver to determine the timing the received signal. The signal received is sampled and the timing is extracted based on some criteria. For example, in a Bluetooth receiver, a correlator is operative to correlate the received signal against a known access code and to generate a trigger when a correlation threshold is exceeded. The trigger signal is subsequently used to derive the receive timing of the remainder of the message.

Such a correlator typically uses an oversampling clock that is some multiple (e.g., 8×, 16×, etc.) of the Bluetooth bit rate of 1 Mbps. A block diagram illustrating a prior art sampling clock generator circuit suitable for use in a Bluetooth receiver is shown in FIG. 1. The circuit, generally referenced 10, comprises reference registers 22 for storing the access code, an input data shift register 20, a clock source 12, programmable frequency divider 14, Phase Locked Loop (PLL) 16, and compare circuitry 24 for generating a correlation result.

The oversampling clock 18 normally requires a PLL or an external clock at a multiple of the Bluetooth bit rate. For example, a clock source of 13 MHz is divided by a divide by 13 frequency divider before being input to the PLL. The PLL functions to generate an 8 MHz oversampling clock which is used to sample the input received signal eight times for each symbol period. In this example, the access code is 64 symbols long, thus requiring a 512 long shift register in the correlator for holding 64×8 input samples. The timing is recovered by looking for a maximum in the correlation result. Once the timing is recovered, the remainder of the packet can be recovered with ±⅛ bit resolution. It is desirable to sample the input data at a resolution of about ⅛ bit in order to provide sufficient timing resolution and minimize the bit-error-probability (BER) for the entire packet of the received data.

A disadvantage of this timing recovery scheme is the requirement to use the frequency divider and PLL to generate the sampling timing. Depending on the implementation, both components take up valuable 'real estate' either in board or in chip space. It is desirable to be able to eliminate both the frequency divider and the PLL especially if the reference frequency clock source is an odd frequency that is not a multiple of the Bluetooth symbol rate. This is because in this case, the realization of a frequency divider and PLL able to handle odd frequencies that are not a multiple of the Bluetooth rate becomes substantially complex.

Other disadvantages of the use of the frequency divider and PLL, which are typically realized using analog circuitry, are that (1) the use of analog circuitry results in sensitivity to variations typically encountered in chip fabrication processes that require compensation thus reducing the yield and increasing the cost, (2) current consumption is increased, (3) silicon size or board space is increased, (4) development time is increased, and (5) the migration to more advanced semiconductor processes becomes more difficult in comparison with purely digital implementations.

There is therefore a need for a purely digital oversampling clock scheme that is capable of generating the sampling instance timing, such that the resulting timing accuracy is not affected. In addition, it is desirable to realize such an oversampling clock scheme that would be capable of deriving the required oversampling timing from a wide range of arbitrary reference clock frequencies, thereby eliminating the need for a dedicated clock source with its associated cost and size.

SUMMARY OF THE INVENTION

The present invention is a timing estimation mechanism operative to generate an oversampling clock signal for a large range of clock frequencies that does not require use of a PLL. The oversampling timing mechanism generates appropriate timing instances without requiring a specific external clock source but rather can utilize a clock source having any arbitrary frequency. The mechanism of the present invention is especially suited for use in applications where a specific external clock source is not available and wherein the implications of the use of a PLL cannot be tolerated.

In accordance with the invention, the oversampling clock estimation mechanism is applicable to a wide range of circuits and systems. One example application is provided wherein the oversampling clock estimation mechanism is used in a Bluetooth receiver to implement a fractional correlator that supports a 7 or 8 samples/symbol oversampling scheme. The oversampling correlator scheme is based on an input reference frequency, which is directly connected to the correlator. The oversampling clock estimation mechanism functions to generate the clock signal which is unevenly distributed over the Bluetooth symbol period whereby on average, the desired number of samples is produced over the correct time duration, i.e. multiple Bluetooth symbol period time.

Note that many aspects of the invention described herein may be constructed as software objects that are executed in embedded devices as firmware, software objects that are executed as part of a software application on either an embedded or non-embedded computer system running a real-time operating system such as WinCE, Symbian, OSE, Embedded LINUX, etc. or non-real time operating system such as Windows, UNIX, LINUX, etc., or as soft core realized HDL circuits embodied in an Application Specific Integrated Circuit (ASIC) or Field Programmable Gate Array (FPGA), or as functionally equivalent discrete hardware components.

There is thus provided in accordance with the present invention a method of determining oversampling timing from a reference clock source for an input symbol stream, the method comprising the steps of enabling reference clock cycles periodically an integer number of times during each symbol period, each reference clock cycle enabled resulting in a sampling instance, enabling reference clock cycles zero or more additional times each symbol period to produce a minimum number of sampling instances per symbol period and delaying sampling instances zero or more compensation reference clock cycles during each averaging period consisting of one or more symbol periods.

There is also provided in accordance with the present invention a method of determining oversampling timing from a reference clock source for an input symbol stream, the method comprising the steps of enabling reference clock cycles a predetermined number of times during each symbol period, injecting a controlled amount of jitter into the oversampling timing by enabling zero or more additional reference clock cycles each symbol period and correcting any accumulated drift in the oversampling timing by enabling zero or more additional reference clock cycles after each averaging period of symbol times.

There is further provided in accordance with the present invention an apparatus for generating oversampling timing from a reference clock source comprising a chip-step counter adapted to be clocked via the reference clock source and to generate a first terminal count every chip-step cycles of the reference clock, an N step counter adapted to be clocked by the first terminal count signal and to generate a second terminal count every N chip steps, wherein N is a positive integer, an averaging counter clock adapted to be clocked by the second terminal count signal and to generate a third terminal count signal every averaging period number of N chip steps, a drift lookup table coupled to the output of the averaging counter and operative to indicate a number of compensation cycles to be added over each averaging period, means for inserting zero or more reference clock cycles during each symbol period and means for inserting zero or more compensation reference clock cycles as indicated by the drift lookup table over each averaging period.

There is also provided in accordance with the present invention an apparatus for generating oversampling timing from a reference clock source for an input symbol stream comprising means for enabling reference clock cycles a predetermined number of times during each symbol period, means for injecting a controlled amount of jitter into the oversampling timing by enabling zero or more additional reference clock cycles each symbol period and means for correcting any accumulated drift in the oversampling timing by enabling zero or more additional reference clock cycles after each averaging period of symbol times.

There is still further provided in accordance with the present invention a correlator for recovering the timing from an input symbol stream comprising a plurality of symbol correlator cells, each symbol correlator cell comprising a plurality of data registers clocked by an oversampling clock and adapted to latch input samples spanning a symbol duration, wherein the number of input samples is dynamically set in accordance with an oversampling ratio signal, means for latching an input data sample either on the rising or falling edge of a reference clock in accordance with an edge select signal, means for generating an oversampling enable for enabling the plurality of data registers in each symbol correlator cell, the means comprising means for enabling reference clock cycles a predetermined number of times during each symbol period, means for injecting a controlled amount of jitter into the oversampling timing by enabling zero or more additional reference clock cycles each symbol period, means for correcting any accumulated drift in the oversampling timing by enabling zero or more additional reference clock cycles after each averaging period of symbol times and means for correlating the plurality of input samples with a reference value to generate a correlation result therefrom.

BRIEF DESCRIPTION OF THE DRAWINGS

The invention is herein described, by way of example only, with reference to the accompanying drawings, wherein:

FIG. 4 is a first example timing diagram illustrating the generation of the oversampling enable signal from a specific input frequency reference signal;

FIG. 5 is a second example timing diagram illustrating a virtual sampling clock signal effectively used to sample the input data.

DETAILED DESCRIPTION OF THE INVENTION

Notation Used Throughout

Figure 1:
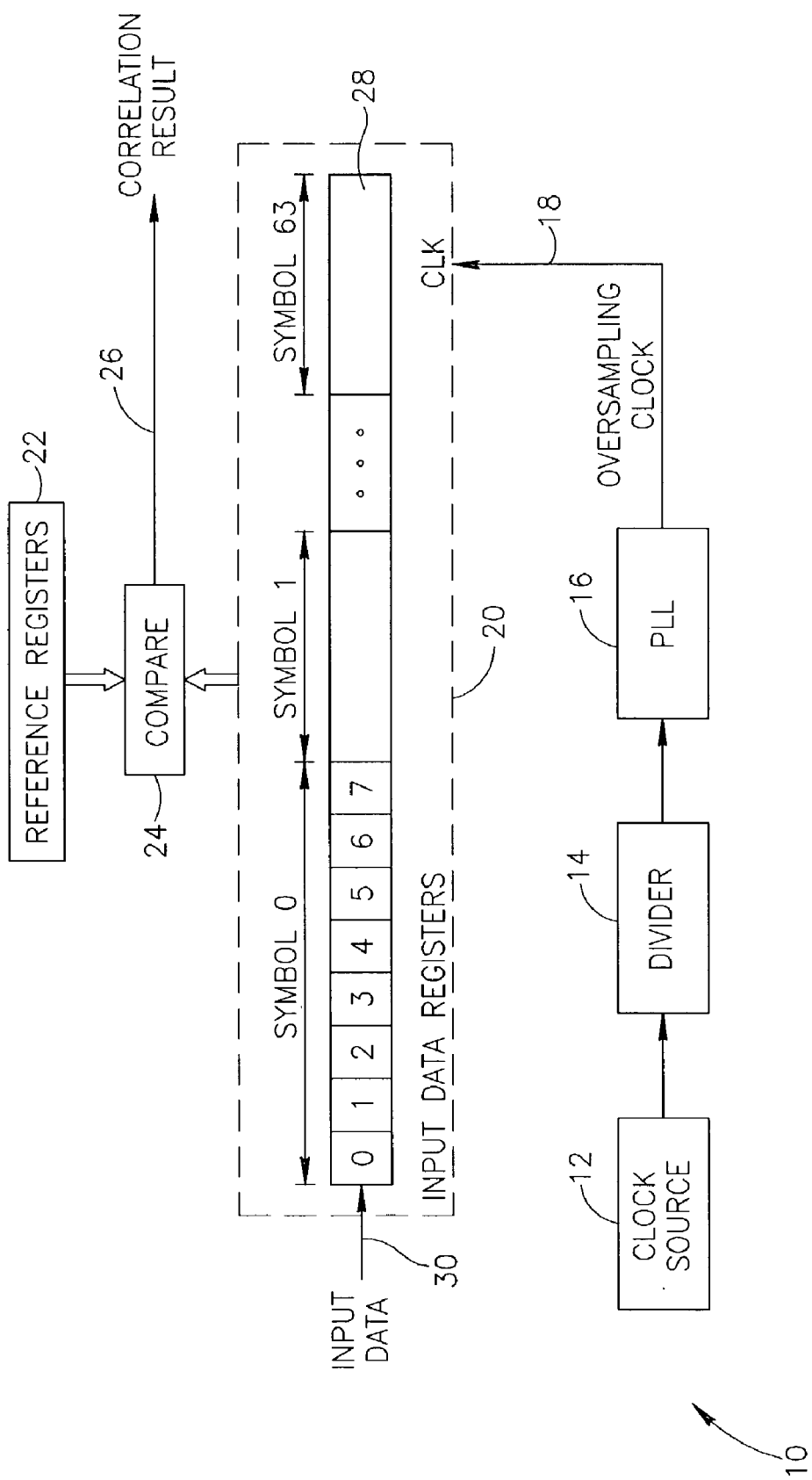
FIG. 1 is a block diagram illustrating a prior art sampling clock generator circuit.

The following notation is used throughout this document.

| Term | Definition |
|------|------------|
| ASIC | Application Specific Integrated Circuit |
| BER  | Bit Error Rate |
| DFF  | D Flip-Flop |
| FPGA | Field Programmable Gate Array |
| OCEM | Oversampling Clock Estimation Module |
| PLL  | Phase Locked Loop |
| RAM  | Random Access Memory |
| ROM  | Read Only Memory |
| SBR  | Symbol Boundary Remainder |
| TC   | Terminal Count |

Detailed Description of the Invention

The present invention is an oversampling clock estimation mechanism operative to generate an oversampling clock signal for a large range of clock frequencies that does not require a PLL. The oversampling timing mechanism generates appropriate timing instances without requiring a specific external clock source but rather can utilize a clock source having any arbitrary frequency. The mechanism of the present invention is especially suited for use in applications where a specific external clock source is not available and wherein the implications of the use of a PLL cannot be tolerated.

In accordance with the invention, the oversampling clock estimation mechanism is applicable to a wide range of circuits and systems. One example application is provided wherein the oversampling clock estimation mechanism is used in a Bluetooth receiver to implement a fractional correlator that supports a 7 or 8 samples/symbol oversampling scheme. The oversampling correlator scheme is based on an input reference frequency, which is directly connected to the correlator. The oversampling clock estimation mechanism functions to generate the clock signal which is unevenly distributed over the Bluetooth symbol period whereby on average, the desired number of samples is produced over the correct time duration, i.e. multiple Bluetooth symbol period time.

It is noted that the present invention is not limited to use with any particular modulation or communication system. Throughout this document the invention is described in reference to a Bluetooth communication system. Note that the invention is not limited to this communications system, as one skilled in the relevant electrical arts can apply the oversampling clock estimation mechanism of the present invention to other communication systems and modulations without departing from the spirit and scope of the present invention. Depending on the particular application and implementation, the invention is applicable for use with a multitude of communication systems, modulations and protocols. In general, the oversampling clock estimation mechanism of the present invention is applicable wherever it is advantageous to generate oversampling timing from an arbitrary clock source without the use of a PLL. Such a need may be encountered not only in wireless communication systems, such as those based on the Bluetooth technology, but also in non-wireless or non communication systems.

Throughout this document the term symbol period is defined as the time duration of a single symbol (e.g., Bluetooth symbol of 1 μsec). A chip step is defined as the number of reference clock cycles between the generation of oversampling timing instances. The number of steps N is defined as the integer number of chip steps within a symbol. The Symbol Boundary Remainder (SBR) is defined as the number of reference clock cycles that must be added to each symbol in order to obtain the correct number of timing instances per symbol period. The averaging period A is defined as the minimum duration time (expressed as an integer number of symbol periods) that can be represented by an integer number of periods of the reference clock. The number of compensation clock cycles K is defined as the number of reference clock cycles that must be added each averaging period to yield a sufficient number of oversampling timing instances. A timing instance (or sampling instance) is defined as a point in time when a sample of the input signal is taken.

Figure 2:
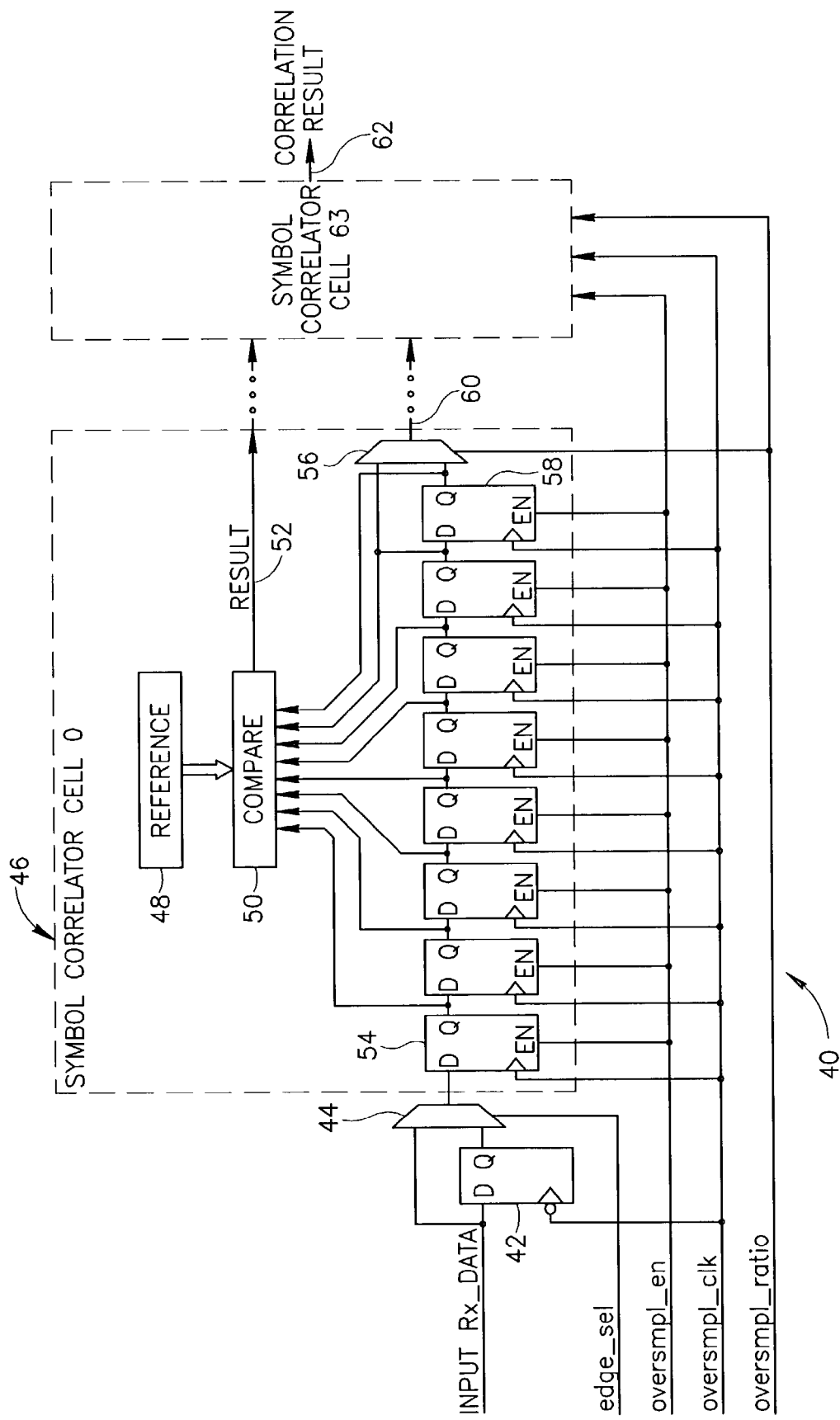
FIG. 2 is a block diagram illustrating the symbol correlator cell of the present invention.

A block diagram illustrating the symbol correlator cell of the present invention is shown in FIG. 2. The fractional correlator, generally referenced 40, comprises a plurality of symbol correlator cells 46 and circuitry for sampling the input signal on the rising or falling edge of the clock. In this example, the correlator comprises 64 cells wherein each cell is adapted to generate a partial correlation over a symbol duration. Each correlator cell comprises a reference register 48 and a compare circuit 50. The compare circuit is adapted to generate a correlation result 52 which is output to the downstream cell or alternatively input to a circuit that combines the results from each of the cells. The output of the correlator 40 is a correlation result that is used to search for a particular access code in the received signal.

Each cell also comprises a shift register for clocking in the input data samples. In accordance with the invention, the shift register has a variable length and, in this example, may comprise either 7 or 8 D flip flops (DFFs). Seven of the DFFs 54 are fixed and the output of an eighth DFF 58 is conditionally inserted via multiplexer 56 in accordance with the oversmpl_ratio signal. The output 60 of the multiplexer represents the output of the shift register and is input to the downstream symbol correlator cell.

The registers in each correlator cell are enabled by the oversmpl_en signal. In accordance with the invention, the oversmpl_clk signal may comprise any available reference clock source wherein the appropriate timing instances may be derived by the oversampling clock estimation mechanism module (OCEM). The OCEM is operative to generate the oversmpl_en, oversmpl_ratio and edge_sel signals as described in more detail infra.

The input_Rx_data is input to DFF 42 and also input to multiplexer 44 whose selection is controlled by the edge_sel signal. The register 42 is clocked by the negative edge of the oversmpl_clk signal wherein the eight registers in each correlator cell are clocked on the positive edge of the oversmpl_clk signal. Clocking on the negative edge enables the sampling at X.5 chip spacing as described in more detail infra.

Key features of the present invention are that it provides (1) the correlator oversampling clock generation from an arbitrary reference clock source, (2) the fractional correlator has a timing resolution of half the reference frequency period and can be configured for operation either with a 7 or 8 oversampling scheme, and (3) the generation of the Bluetooth main clock. The correlator of the present invention is operative to both identify the expected access code from the received signal and to recover the timing therefrom. The timing is recovered with a resolution of ⅛ bit time. Once the timing is recovered, the remainder of the packet can be recovered with ±⅛ bit time resolution. Note that excess drift during receipt of the packet is typically not a concern assuming the use of a sufficiently stable clock source, e.g., a crystal based source having 20 ppm accuracy.

Although excessive drift cannot be tolerated in order to accurately receive the packet, a small amount of jitter can be tolerated. A key feature of the invention is that a controlled amount of jitter between sampling instances can be tolerated without degradation of performance. In other words, it is not necessary to sample at exactly the bit rate at the same point in time for each bit. The invention is operative to generate sampling timing from an arbitrary reference clock source such that the sampling timing may jitter but with no effect on the recoverability of the bits. The invention thus relies on the average sampling timing to recover the data without degrading the performance of the receiver, i.e. without an increase in the BER.

For any reference frequency $f_{REF}$, the averaging period A can be represented by an integer number of reference clock cycles as expressed by the following $$A \cdot P = \left(\left(\frac{1}{f_{REF}} \cdot chip\_step\right) \cdot N + SBR\right) \cdot A + K \cdot \frac{1}{f_{REF}} \quad (1)$$

where

A is the averaging period (i.e. the minimum duration time that can be represented by an integer number of reference clock periods;

P is the symbol period (e.g., 1 microsecond for Bluetooth systems);

$f_{REF}$ is the reference clock frequency;

chip_step is the number of cycles of the reference clock between sampling instances in each symbol;

N is the number of chip steps in a symbol period;

SBR is the symbol boundary remainder;

K is the number of compensation reference clock cycles to be added over the averaging period;

Considering the constraint that the total number of sampling instances in each symbol period should be 5, 6, 7 or 8, (i.e. the value for N is restricted to 5, 6, 7 or 8) the parameters in Equation 1 can be determined. The averaging period can be found by finding the minimum multiplier that yields an integer frequency. As an example, the parameters for several frequencies are presented below in Table 1 wherein the units for most quantities is reference clock cycles.

TABLE 1

OCEM Parameters for Example Frequencies

| Frequency | Application | Chip Step | Number of Steps N | SBR | Averaging Period | Compensation Cycles over Averaging Period |
|---|---|---|---|---|---|---|
| 13 MHz | GSM | 2 | 6 | 1 | 1 | 0 |
| 26 MHz | GSM | 4 | 6 | 2 | 1 | 0 |
| 16.2 MHz | CDMA | 2 | 8 | 0 | 5 | 1 |
| 19.2 MHz | CDMA | 3 | 6 | 1 | 5 | 1 |
| 19.44 MHz | 3G | 3 | 6 | 1 | 25 | 11 |
| 38.4 MHz | 3G | 6 | 6 | 2 | 5 | 2 |

The OCEM is operative to generate oversampling timing for any frequency in accordance with the programmable values of A, chip_step, N, SBR and K. The range of values are: 1 to 100 for A (for two decimal digit reference frequency precision); 5 to 8 for N; 1 to 7 for the chip-step; and 0 to 3 for the SBR. Note that the resolution for the chip-step is 0.5 and a chip step of 1 corresponds to an $f_{REF}$ equal to the oversampling clock. Note also that to simplify implementation, it is preferable that the chip-step not be an integer, N must be even (e.g., for a chip step of 1.5, N must be 6 or 8).

Figure 3:
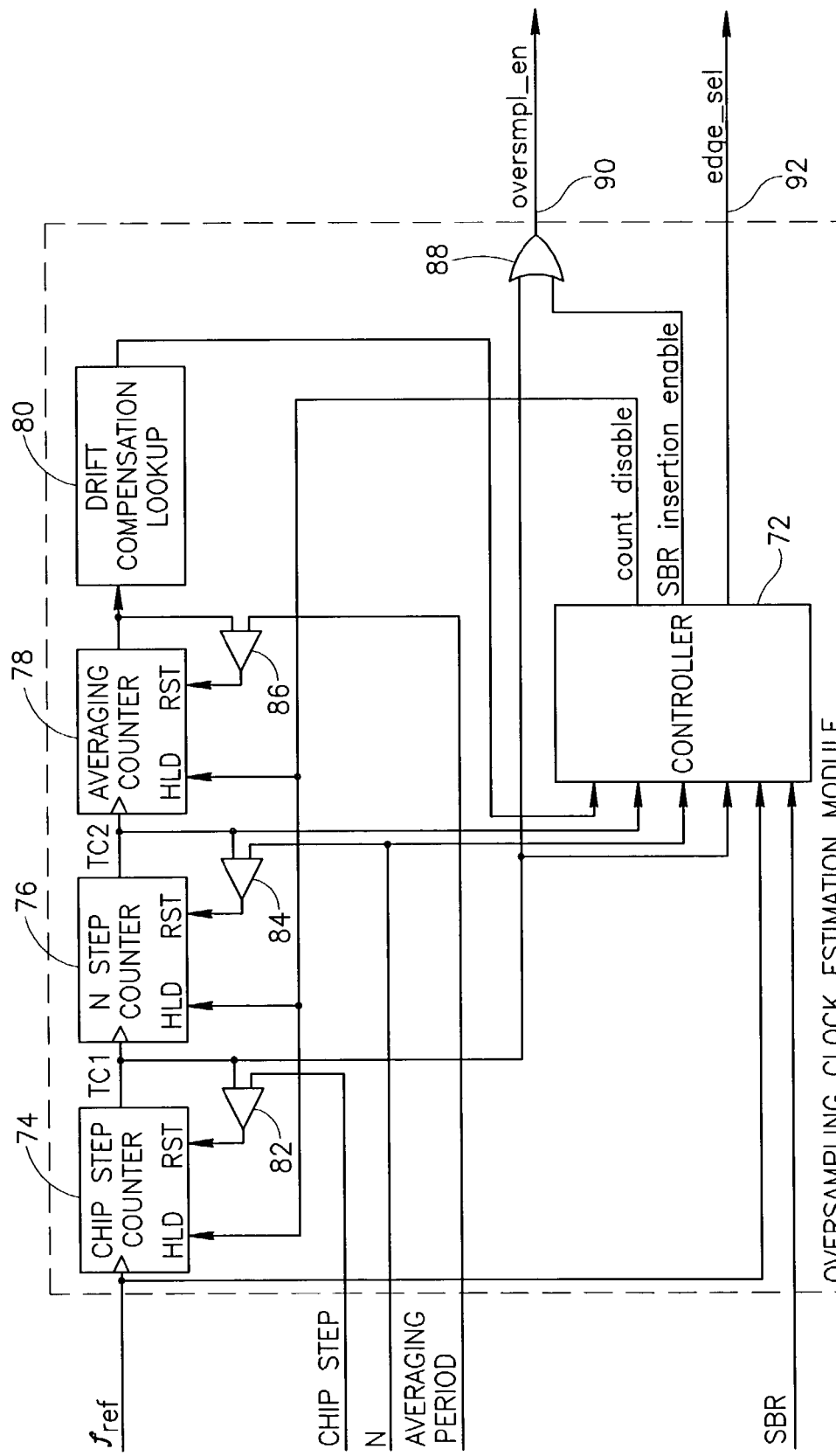
FIG. 3 is a block diagram illustrating the oversampling clock estimation module (OCEM) constructed in accordance with the present invention.

A block diagram illustrating the oversampling clock estimation module (OCEM) constructed in accordance with the present invention is shown in FIG. 3. The OCEM, generally referenced 70, comprises a chip-step counter 74, N step counter 76, averaging counter 78, drift compensation lookup table 80 and a controller state machine 72.

In operation, the reference frequency clock source $f_{REF}$ is used to clock the chip step counter 74. The terminal count 1 (TC1) is input to the OR gate 88, to the comparator 82 and also serves as the clock to the N step counter. Every chip-step number of reference clock cycles, the oversmpl_en signal 92 is asserted. The oversmpl_en signal can then gated with the reference clock to generate the sampling timing or can serve as the enable signal to sample registers as shown in FIG. 2. The TC1 is compared to the chip-step setting and the chip-step counter is reset when the output of the counter is equal to the chip-step.

The terminal count 2 (TC2) output of the N step counter is input to comparator 84 and serves as the clock to the averaging counter. Every N number of chip-step cycles, the TC2 signal is asserted and causes the N step counter to reset. The TC2 signal is an input to the controller 72 which may be implemented as a state machine or equivalent. The value N represents the number of chip steps in each symbol period.

After the completion of N chip steps, it is checked whether SBR is non-zero. If SBR is zero, then the counters continue as normal, resetting and beginning their counting again. If SBR is greater than zero, the counters are disabled (i.e. placed in hold mode) via count_disable signal generated by the controller. The SBR insertion enable signal is asserted for SBR number of reference clock cycles. Once complete, the hold on the counters is removed and counting continues as normal. Thus, the OCEM is capable of inserting one or more sampling instances in each symbol period. Depending on the reference frequency $f_{REF}$, one or more SBR enables are required to be inserted in order to maintain 7 or 8 samples per symbol period. The insertion of SBR cycles typically adds jitter to the resulting oversampling timing but increases the accuracy of the sampling timing since it is the average timing that is important.

An averaging counter clocked by the TC2 signal is the next counter in the cascade of counters in the OCEM. The function of the averaging counter is to correct for timing drift that would otherwise accumulate if no correction were performed. Within each averaging period, zero or more compensation cycles of the reference clock are inserted to eliminate accumulated drift in the oversampling timing. For example, for 16.2 MHz, the averaging period is 5 and the number of compensation cycles to be added is 1. Every 80 cycles, an additional cycle must be added to compensate for the accumulated drift of one cycle. The drift grows by approximately 1 µs−2×8×(1/16.2×10$^6$)≅1.2 ns each symbol period with a total drift of approximately 6 ns after the averaging period of 5 symbols. Thus, every fifth symbol period, the timing of the last sample is moved by one cycle of the reference clock thus eliminating the drift.

The averaging counter is used to keep track of the symbol periods wherein each count of the averaging counter represents a symbol period. The averaging counter is cleared when the output reaches the averaging period terminal count as determined by the comparator 86. The count value functions as the address for the drift compensation lookup memory 80, which may be implemented using any suitable memory means such as RAM, ROM, volatile or non-volatile memory. A '0' indicates that a reference clock cycle is not added while a '1' indicates that one cycle of the reference clock is to be added at the end of the current symbol boundary.

If the compensation value for an averaging period is greater than one, the cycles are spread evenly over the averaging period to minimize the jitter. The compensation data output of the drift compensation lookup table is input to the controller. A value of '1' for the compensation data output causes the controller to halt the counters by asserting the HLD inputs for one reference clock cycle. At the end of the reference clock cycle, the hold is released and counting resumes as normal.

Note that the precision of the input reference frequency that can be handled is limited by the size of the drift compensation lookup table. With a table size of 100, the input reference frequency may have two or more arbitrary digits after the decimal point. Additional digits require larger lookup tables since odd frequencies may require a large number of entries.

The controller is also operative to generate the edge_sel signal 92 which is used in the event the chip-step value is not an integer value.

A first example timing diagram illustrating the generation of the oversampling enable signal from an input frequency reference signal is shown in FIG. 4. In this example, the reference clock frequency is 13 MHz and in accordance with the invention, either a 7× or 8× oversampling clock is generated therefrom. Assuming a Bluetooth symbol rate of 1 MHz, there are exactly 13 cycles the reference clock in one symbol period. Thus, the parameters from Table 1 include: chip step of 2 cycles, number N of steps is 6, the SBR is 1, the averaging period is 1 and the number of compensation cycles is 0 for each averaging period.

The parameters are input to the OCEM, which is operative to generate the correct oversmpl_en signal to generate 7 sampling instances per symbol period. Every two reference clock cycles, for six consecutive times, the enable signal is asserted as indicated by arrows 100. After the sixth enable, an additional seventh enable is generated since the SBR is 1. This causes the enable signal to be extended. The averaging period is one since an integer number of reference cycles occur within a symbol period. At the end of each averaging period, zero cycles of the reference clock are added since there is no accumulated drift over time to correct. The 13 MHz clock rate can be expressed in terms of the parameters mathematically as [2×6+1]×1+0=13.

A second example timing diagram illustrating a virtual sampling clock signal effectively used to sample the input data is shown in FIG. 5. This example is shown to illustrate the generation of the enable signal with a non-integer chip-step value, e.g., a chip-step of 1.5. In the case of a non-integer chip-step value, a counter (not shown) is used to count 2•chip_step value. Using chip-step of 1.5 as an example, the counter period will be 3. In order to sample on a 0.5 step boundary of the reference clock, the edge_sel signal is used to clock the input sample at the negative edge of the reference clock rather than the positive edge in register 42 (FIG. 2). The edge_sel signal is asserted during counter values CNT=1 while oversmpl_en is asserted when CNT equals 1 and 2. The sampling_clk signal indicated in the dotted line is a virtual sampling clock signal and does not represent a physically generated signal. It is shown to illustrate the effective sampling of the input signal on the positive edge of the sampling_clk when considering the clocking of the input signal on the negative edge of the reference clock when CNT=1.

The roll over counter points and counter values for assertion of the edge_sel and oversmpl_en signals are presented below in Table 2.

TABLE 2

Parameters for edge_sel and oversampl_en Generation for Non-Integer Chip-Steps

| Chip-Step | Roll Over Counter Value | CNT value for assertion of edge_sel | CNT value for assertion of oversmpl_en |
|---|---|---|---|
| 1.5 | 3 | 1 | 1 and 2 |
| 2.5 | 5 | 2 | 2 and 4 |
| 3.5 | 7 | 3 | 3 and 6 |
| 4.5 | 9 | 4 | 4 and 8 |
| 5.5 | 11 | 5 | 5 and 10 |
| 6.5 | 13 | 6 | 6 and 12 |

Note that the parameters for chip step values of 7.5, 8.5, etc. can be determined by continuing the pattern presented above.

As an example, a reference clock frequency of 12 MHz yields a chip step of 1.5 cycles/sample to generate 8 sampling instances per 1 microsecond symbol period. In this case, the edge_sel signal is asserted to clock the input sample on the negative edge of the reference clock when the counter value CNT=1.

Note that alternatively, for a 12 MHz reference clock, 6 samples per symbol may be generated without any SBR or compensation cycles and without the need to use a non-integer chip-step. In this case, however, the correlator must be adapted to correlate using 6 samples/symbol rather than 7 or 8. In the example described herein, the requirement of the OCEM to generate 7 or 8 sampling instances per symbol is a constraint imposed by the correlator. The OCEM may be modified by one skilled in the art to generate different parameters in accordance with the particular implementation and application of the invention.

Note also that the OCEM of the present invention is not limited to use with a correlator. The oversampling clock estimation mechanism may be used with any arbitrary clock source to generate the appropriate sampling instances for timing recovery applications or any other purpose wherein a key advantage is the elimination of the requirement to use a PLL.

Figure 6:
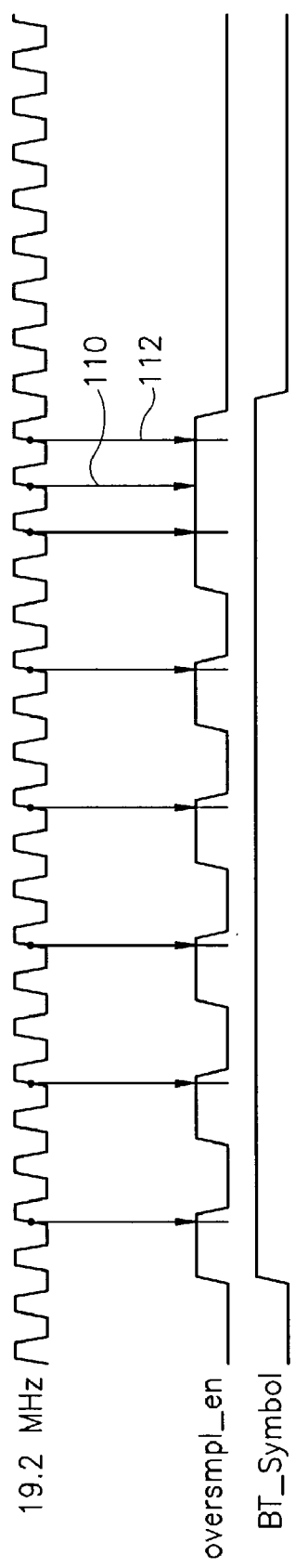
FIG. 6 is a third example timing diagram illustrating the generation of the oversampling enable signal from a different input frequency reference signal and having an averaging period greater than 1.

A third example timing diagram illustrating the generation of the oversampling enable signal from an input frequency reference signal and having an averaging period greater than 1 is shown in FIG. 6. For some reference frequency values, the Bluetooth symbol period of 1 microsecond cannot be represented by an integer number of reference clock cycles. In these cases, drift will accumulate if not corrected. Therefore, in accordance with the invention, drift correction is performed over each averaging period by adding one or more cycles of the reference frequency.

With reference to FIG. 6, the enable signal is asserted every three cycles of the 19.2 MHz clock in accordance with the chip step of 3 from Table 1. Thus, for each symbol period, the enable signal is asserted 6 times followed by a seventh assertion for SBR=1 as indicated by arrow 110. During this assertion (referenced 110), the oversampl_en signal is high (SBR sampling). This is repeated for four symbols since the averaging period is 5 in this case. At the end of the fifth symbol time, an extra cycle of the reference clock is inserted for compensation so as to extend the timing of the last SBR enable assertion by one reference clock cycle, as indicated by arrow 112. This effectively cancels the timing drift that accumulated over the previous five symbol periods.

As described supra, the drift compensation cycles are stored in the drift compensation lookup table 80 (FIG. 3) in the OCEM. In the example presented above, the first five locations of the memory for a reference frequency of 16.2 MHz would contain 0,0,0,0,1. Thus, one compensation reference clock cycle is added after the fifth symbol in accordance with the averaging period of 5.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of determining oversampling timing from a reference clock source for an input symbol stream, said method comprising the steps of:

enabling reference clock cycles periodically an integer number of times during each symbol period, each reference clock cycle enabled resulting in a sampling instance;

enabling reference clock cycles zero or more additional times each symbol period to produce a minimum number of sampling instances per symbol period;

delaying sampling instances zero or more compensation reference clock cycles during each averaging period consisting of one or more symbol periods; and wherein the timing of said sampling instances is controlled in accordance with the following $$A \cdot P = \left( \left( \frac{1}{f_{REF}} \cdot \text{chip\_step} \right) \cdot N + SBR \right) \cdot A + K \cdot \frac{1}{f_{REF}}$$

wherein A is the averaging period representing the minimum number that can be represented by an integer number of periods of said reference clock, $f_{REF}$ is the reference clock frequency, P is the symbol clock period, N is the number of chip steps in a symbol period, SBR is the symbol boundary remainder, and K is the number of compensation reference clock cycles to be added over the averaging period.

2. The method according to claim 1, adapted to be implemented in an Application Specific Integrated Circuit (ASIC).

3. The method according to claim 1, adapted to be implemented in a Field Programmable Gate Array (FPGA).

4. A method of determining oversampling timing from a reference clock source for an input symbol stream, said method comprising the steps of:
    enabling reference clock cycles a predetermined number of times during each symbol period;
    injecting a controlled amount of jitter into said oversampling timing by enabling zero or more additional reference clock cycles each symbol period; and
    correcting any accumulated drift in said oversampling timing by enabling zero or more additional reference clock cycles after each averaging period of symbol times.

5. The method according to claim 4, wherein the timing of said sampling instances is controlled in accordance with the following $$A \cdot P = \left( \left( \frac{1}{f_{REF}} \cdot \text{chip\_step} \right) \cdot N + SBR \right) \cdot A + K \cdot \frac{1}{f_{REF}}$$

wherein A is the averaging period representing the minimum number that can be represented by an integer number of periods of said reference clock, $f_{REF}$ is the reference clock frequency, P is the symbol clock period, N is the number of chip steps in a symbol period, SBR is the symbol boundary remainder and K is the number of compensation reference clock cycles to be added over the averaging period.

6. The method according to claim 4, adapted to be implemented in an Application Specific Integrated Circuit (ASIC).

7. The method according to claim 4, adapted to be implemented in a Field 15 Programmable Gate Array (FPGA).

8. An apparatus for generating oversampling timing from a reference clock source, comprising:
    a chip-step counter adapted to be clocked via said reference clock source and to generate a first terminal count every chip-step cycles of said reference clock;
    an N step counter adapted to be clocked by said first terminal count signal and to generate a second terminal count every N chip steps, wherein N is a positive integer;
    an averaging counter clock adapted to be clocked by said second terminal count signal and to generate a third terminal count signal every averaging period number of N chip steps;
    a drift lookup table coupled to the output of said averaging counter and operative to indicate a number of compensation cycles to be added over each averaging period;
    means for inserting zero or more reference clock cycles during each symbol period; and
    means for inserting zero or more compensation reference clock cycles as indicated by said drift lookup table over each averaging period.

9. The method according to claim 8, wherein the timing of said sampling instances is controlled in accordance with the following $$A \cdot P = \left( \left( \frac{1}{f_{REF}} \cdot \text{chip\_step} \right) \cdot N + SBR \right) \cdot A + K \cdot \frac{1}{f_{REF}}$$

wherein A is the averaging period representing the minimum number that can be represented by an integer number of periods of said reference clock, $f_{REF}$ is the reference clock frequency, P is the symbol clock period, N is the number of chip steps in a symbol period, SBR is the symbol boundary remainder and K is the number of compensation reference clock cycles to be added over the averaging period.

10. The apparatus according to claim 8, adapted to be implemented in an Application Specific Integrated Circuit (ASIC).

11. The apparatus according to claim 8, adapted to be implemented in a Field Programmable Gate Array (FPGA).

12. An apparatus for generating oversampling timing from a reference clock source for an input symbol stream, comprising:
    means for enabling reference clock cycles a predetermined number of times during each symbol period;
    means for injecting a controlled amount of jitter into said oversampling timing by enabling zero or more additional reference clock cycles each symbol period; and
    means for correcting any accumulated drift in said oversampling timing by enabling zero or more additional reference clock cycles after each averaging period of symbol times.

13. The apparatus according to claim 12, adapted to be implemented in an Application Specific Integrated Circuit (ASIC).

14. The apparatus according to claim 12, adapted to be implemented in a Field Programmable Gate Array (FPGA).

15. A correlator for recovering the timing from an input symbol stream, comprising:
    a plurality of symbol correlator cells, each symbol correlator cell comprising a plurality of data registers clocked by an oversampling clock and adapted to latch input samples spanning a symbol duration, wherein the number of input samples is dynamically set in accordance with an oversampling ratio signal;
    means for latching an input data sample either on the rising or falling edge of a reference clock in accordance with an edge select signal;
    means for generating an oversampling enable for enabling said plurality of data registers in each symbol correlator cell, said means comprising:
        means for enabling reference clock cycles a predetermined number of times during each symbol period;
        means for injecting a controlled amount of jitter into said oversampling timing by enabling zero or more additional reference clock cycles each symbol period;
        means for correcting any accumulated drift in said oversampling timing by enabling zero or more additional reference clock cycles after each averaging period of symbol times; and
        means for correlating said plurality of input samples with a reference value to generate a correlation result therefrom.

16. The correlator according to claim 15, wherein each symbol correlator cell is adapted to latch either seven or eight input samples.

17. The correlator according to claim 15, wherein the number of symbol correlator cells comprises 64.

18. The correlator according to claim 15, wherein a symbol period comprises 1 microsecond.

19. The correlator according to claim 15, wherein said reference clock ranges in frequency from 7 MHz to 100 MHz.

20. The method according to claim 15, wherein the timing of said sampling instances is controlled in accordance with the following $$A \cdot P = \left( \left( \frac{1}{f_{REF}} \cdot \text{chip\_step} \right) \cdot N + SBR \right) \cdot A + K \cdot \frac{1}{f_{REF}}$$

wherein A is the averaging period representing the minimum number that can be represented by an integer number of periods of said reference clock, $f_{REF}$ is the reference clock frequency, P is the symbol clock period, N is the number of chip-steps in a symbol period, SBR is the symbol boundary remainder and K is the number of compensation reference clock cycles to be added over the averaging period.

21. The correlator according to claim 15, adapted to be implemented in an Application Specific Integrated Circuit (ASIC).

22. The correlator according to claim 15, adapted to be implemented in a Field Programmable Gate Array (FPGA).

* * * * *